United States Patent [19]
Lauterbach

[11] Patent Number: 5,954,552
[45] Date of Patent: Sep. 21, 1999

[54] COMBINED CLUTCH AND TORSION DAMPER FOR WATER JET PROPULSION

[76] Inventor: Joachim Lauterbach, Apt. 18—1850 Argue Street, Port Coquitlam, B.C., Canada, V3C 5K4

[21] Appl. No.: 09/042,252

[22] Filed: Mar. 13, 1998

[51] Int. Cl.$^6$ .............................. B63H 11/00; F16D 27/02
[52] U.S. Cl. .................. 440/38; 192/84.941; 192/84.96; 440/75
[58] Field of Search .................................. 440/38, 40, 41, 440/42, 43, 75; 192/84.96, 114 R, 209, 84.941, 103 R

[56] References Cited

U.S. PATENT DOCUMENTS

| | | | |
|---|---|---|---|
| 3,601,989 | 8/1971 | Austin | 440/41 |
| 3,623,447 | 11/1971 | Jacobsen | 440/42 |
| 3,747,366 | 7/1973 | Ruggen et al. | 64/11 |
| 3,752,279 | 8/1973 | Briar | 192/84.96 |
| 3,822,568 | 7/1974 | Bohm et al. | 64/11 R |
| 3,868,833 | 3/1975 | Noe et al. | 440/38 |
| 3,988,907 | 11/1976 | Bohm et al. | 464/91 |
| 4,031,714 | 6/1977 | Faust | 64/12 |
| 4,734,080 | 3/1988 | Kronert | 464/26 |
| 5,609,232 | 3/1997 | Brownfield et al. | 192/84.9 |
| 5,720,635 | 2/1998 | Roos | 440/38 |

Primary Examiner—Sherman Basinger
Attorney, Agent, or Firm—Fulwider Patton Lee & Utecht, LLP

[57] ABSTRACT

A combined clutch and torsion damper for a water jet propulsion system for boats permits the impeller to be disengaged whilst the motor remains running. The combined clutch and torsion damper has an outer ring housing with an attachment to the motor, an inner housing, concentric and within the outer ring housing, rotatably mounted on a central shaft, resilient torque transmitting connectors positioned between the inner housing and the outer housing to damper rotational forces transmitted from the outer housing to the inner housing, an electromagnetic clutch positioned between the inner housing and a clutch ring mounted concentrically on the central shaft, and a slip joint connection on the central shaft to a water jet impeller shaft via a universal joint.

14 Claims, 5 Drawing Sheets

COMBINED CLUTCH AND TORSION DAMPER FOR WATER JET PROPULSION

FIELD OF THE INVENTION

The present invention relates to a water jet propulsion system for boats, more specifically, to an electromagnetic clutch with a built-in torsion damper for use with a water jet propulsion system.

BACKGROUND OF THE INVENTION

Water jet boats generally have their water jet impellers connected directly to a motor via a torsion damper combined with a universal joint, or a separate torsion damper and a constant velocity universal joint. Such a system permits the motor to be placed as close as possible to the water jet impeller, thus positioning the motor as far back as possible in the boat. It is preferred to have the motor as close to the stern as possible.

One problem that has always existed with water jet propulsion systems is to keep a boat in a stationary position without shutting off the motor or to clean out the jet intake without shutting off the motor. One solution to this problem is to install a transmission between the impeller and the motor to achieve a neutral position wherein the motor can be warmed up when at anchor or in a marina without creating a water disturbance. This system is also useful when performing tune-ups or checking a high idle, which cannot be done with a direct connection between the impeller and the motor. The transmission system also permits the motor to be used for alternative work such as a front engine power take-off for a generator and the like. Water jets do not need to have a reverse thrust propulsion since the jets have thrust deflectors which are placed at the jet exits to control the direction of water flow or thrust. These deflectors act as a brake for decelerating a boat quickly and also permit reversing a boat when needed.

In most transmissions the input shaft and the output shaft are not in line so the motor has to be mounted in a different position in the boat and this is especially true when a water jet boat is retrofitted with a transmission. Furthermore, a transmission takes up considerably more space and therefore the motor must be placed further towards the bow of the boat which can effect the planing action of a boat. Most water jet impellers are rotated at motor output speed, therefore the transmission has to have a one-to-one ratio which is not a standard transmission and by having a ratio other than one-to-one, the impeller performance is negatively effected. Furthermore, the transmission adds extra weight and requires the presence of oil and oil filters, oil coolers, and raw water heat exchangers to cool oil in the transmission. Also oil temperature and pressure sensors are required together with a mechanical morse cable control to shift the transmission. Furthermore, even a one-to-one transmission has an efficiency loss of from 5% to 10%.

A torsion damper is required between a motor and a water jet impeller to avoid shock and vibration. Motors are generally mounted in a boat on resilient mountings and therefore the torsion damper prevents motor vibration being transferred through to the drive shaft of the impeller and through the impeller bearings to the boat. Universal joints or constant velocity joints take into account movement of a motor on resilient mountings in the boat and provision is made for some slip to occur between the water jet impeller and the motor to allow the engine some freedom of movement in a longitudinal direction.

SUMMARY OF THE INVENTION

The present invention provides an electromagnetic clutch with a built-in torsion damper for installation between a water jet impeller and a motor. In one embodiment the combined clutch and torsion damper has a slip joint connection for connecting to a universal joint joined to an impeller drive shaft. In another embodiment there is provided a mechanical safety lock to lock the clutch in the event of an electrical failure, or in the event excessive slippage occurs due to wear in the clutch. The combined clutch and torsion damper are compact and lightweight to permit the motor to be mounted as close as possible to the water jet impeller.

The present invention provides a combined clutch and torsion damper for a water jet propulsion system comprising an outer ring housing having attachment to a motor; an inner housing, concentric and within the outer ring housing, rotatably mounted on a central shaft; resilient torque transmitting connector members positioned between the inner housing and the outer housing to dampen rotational forces transmitted from the outer housing to the inner housing; an electromagnetic clutch positioned between the inner housing and a clutch ring concentrically mounted on the central shaft, and a slip joint connection on the central shaft, to a water jet impeller shaft, preferably via a universal joint.

BRIEF DESCRIPTION OF THE DRAWINGS

In drawings which illustrate embodiments of the present invention.

DESCRIPTION OF THE PREFERRED EMBODIMENT

Figure 1:
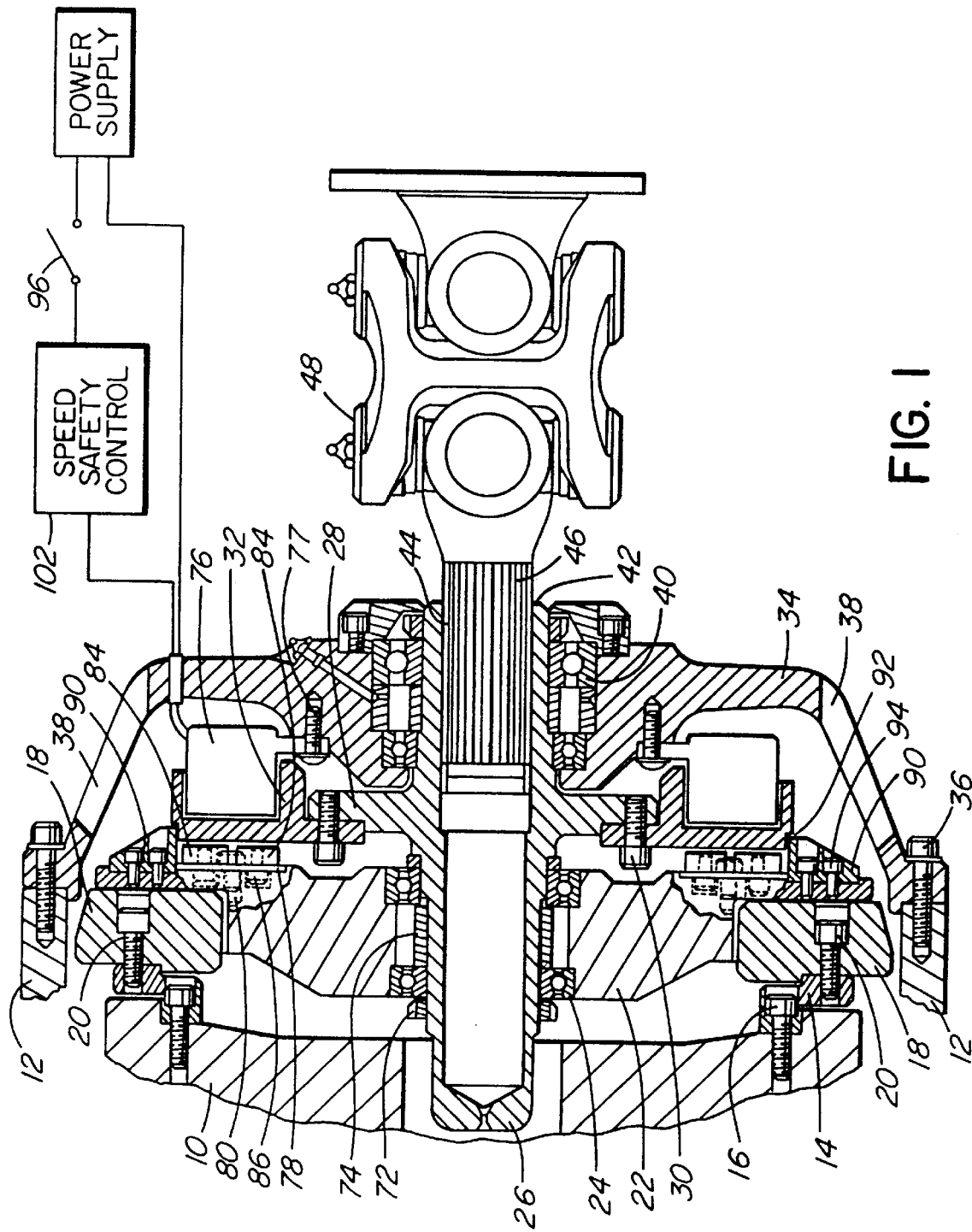
FIG. 1 is a cross-sectional view showing one embodiment of a combined clutch and torsion damper according to the present invention with a universal joint connection to an impeller shaft.
Figure 2:
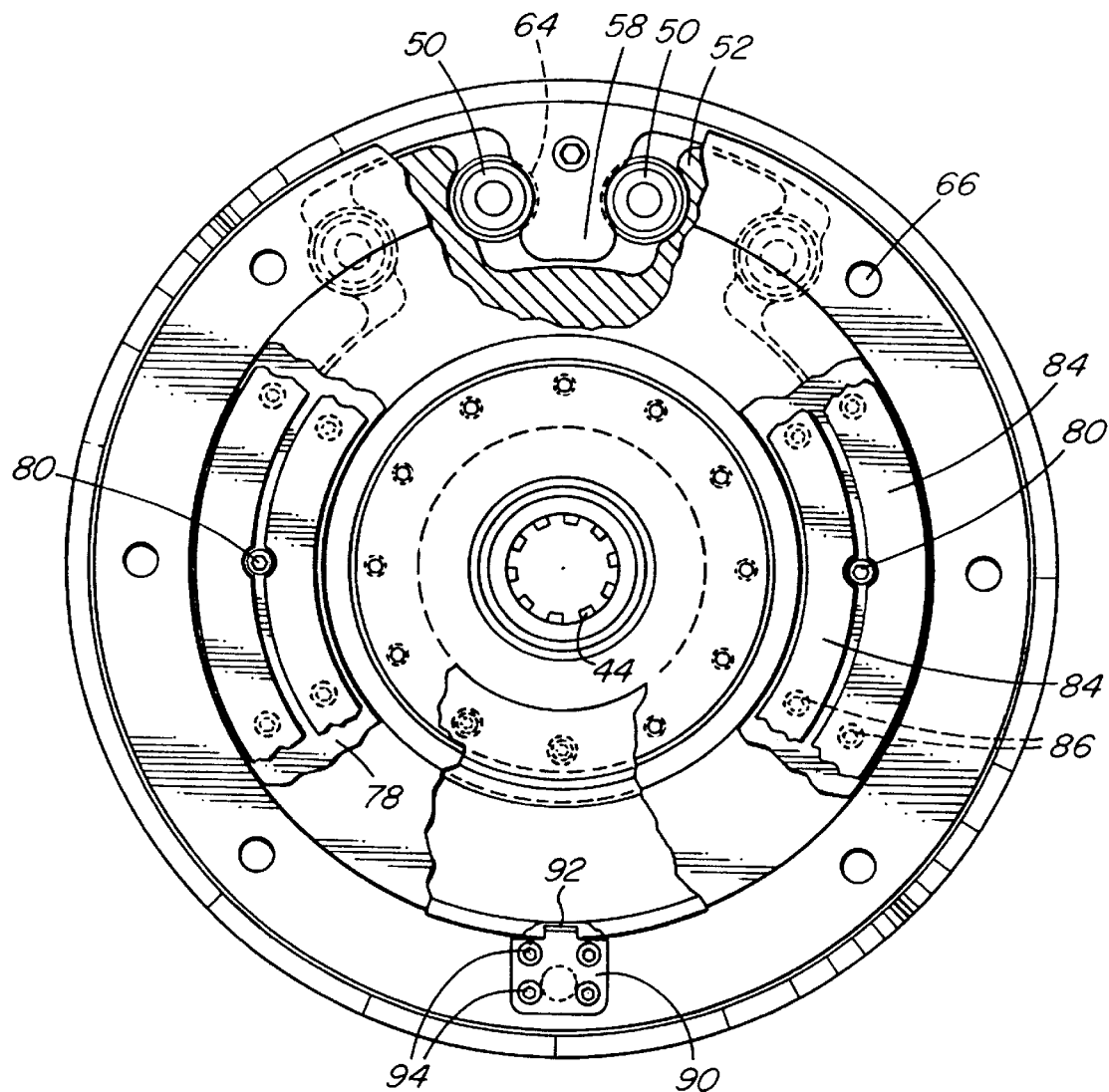
FIG. 2 is an end view with partial cross-sectional views showing the combined clutch and torsion damper of FIG. 1.

A combined clutch and torsion damper is shown in FIGS. 1 and 2 wherein the flywheel 10 of a motor rotates within a motor housing 12. An adaptor ring 14 is shown attached to the flywheel 10 by machine screws 16 and has an outer ring housing 18 attached to the adaptor ring 14 by means of machine screws 20. In some cases the adaptor ring 14 may be omitted and the outer ring housing 18 attaches directly to the flywheel 10. Inside the outer ring housing 18 and concentric therewith is an inner housing 22 mounted on sealed antifriction bearings 24 to a hollow central shaft 26. The central shaft 26 is case hardened steel and is hollow to reduce weight. Because the shaft 26 is hollow, more air is able to circulate which assists in cooling the clutch and torsion damper assembly. The shaft 26 has a flange 28 which has machine bolts 30 joining the flange 28 to a clutch ring 32. A bell housing 34 connects to the motor housing 12 by machine bolts 36 and has access holes 38 with covers (not shown) for inserting mechanical safety locks as will be described hereafter. The bell housing 34 has sealed bearings 40 mounted on a forward end 42 of the central shaft 26. An interior spline connection 44 is provided at the end of the central shaft 26 and shown fitted therein is a spline shaft 46 of a universal joint 48.

Resilient torque transmitting connector members 50, as shown in FIG. 2, are substantially cylindrical made from urethane and are oil and chemical resistant as well as being heat resistant up to 230° F. (110° C.). These connector members 50 are positioned between the inner housing 22 and the outer housing 18 to dampen rotational forces transmitted from the outer housing 18 to the inner housing 22.

Figure 4:
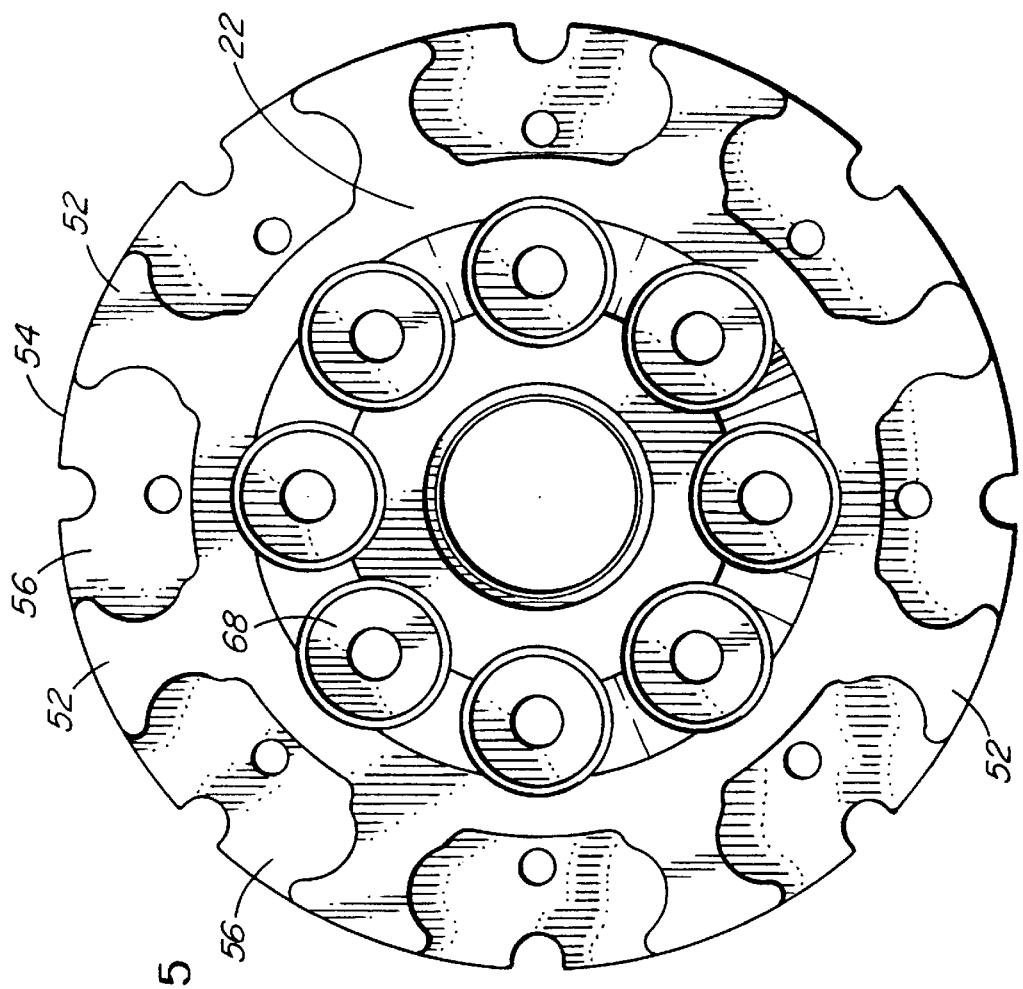
FIG. 4 is a left end view showing the inner housing taken at ←4 of FIG. 3.
Figure 3:
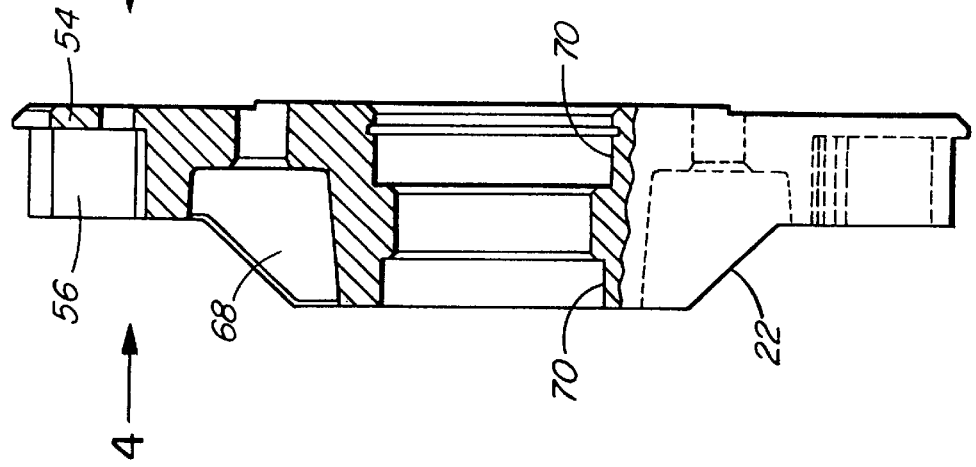
FIG. 3 is an axial cross-sectional view showing an inner housing of the combined clutch and torsion damper of FIG. 1.
Figure 5:
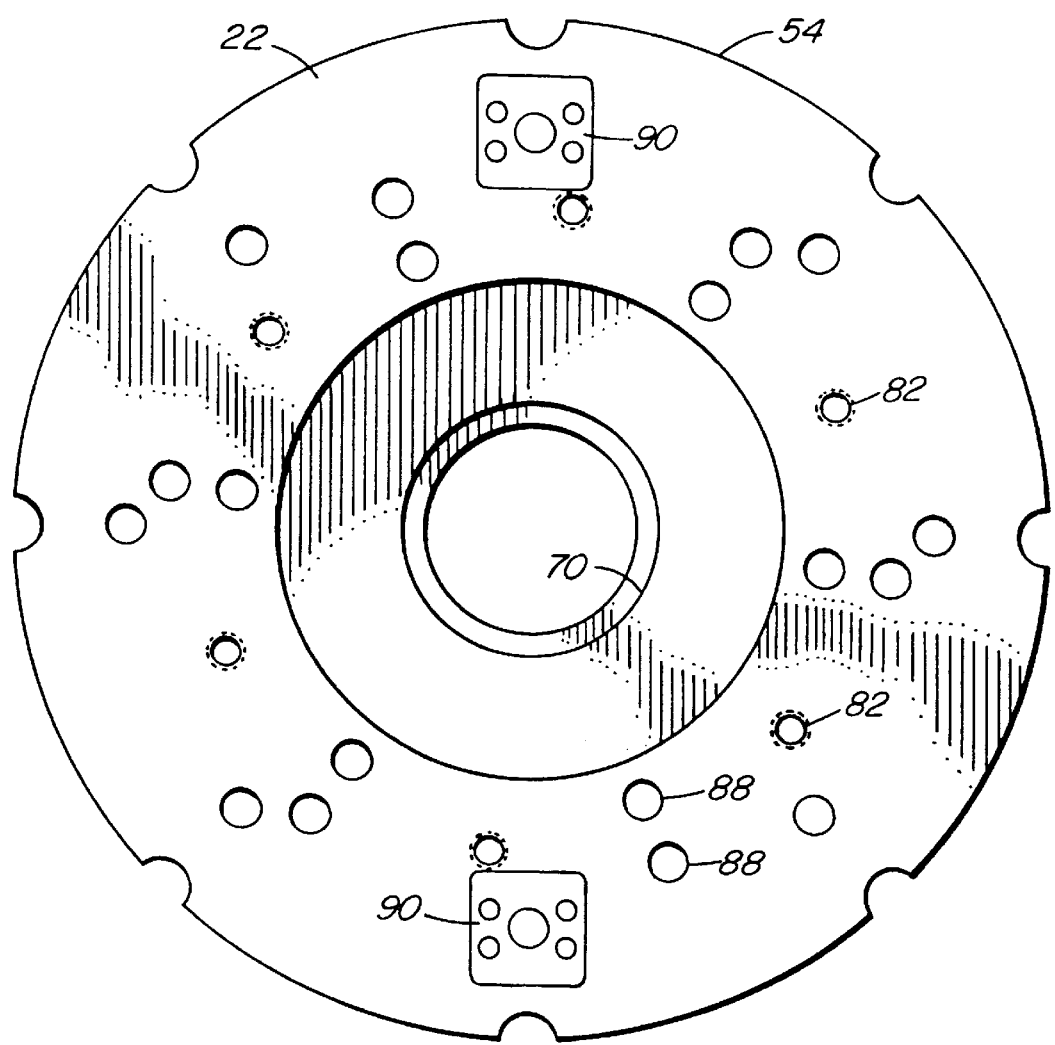
FIG. 5 is a right end view showing the inner housing taken at →5 of FIG. 3.

The inner housing 22 is shown in FIGS. 3, 4 and 5 and has outward projecting shoulders 52 with curved radial surfaces curved to the diameter of the connector members 50 as shown in FIG. 2.

A peripheral disc 54 extends on the outside of the inner housing 22 and in combination with the outward projecting shoulders 52 provide inner location sites 56 for the connector members 50.

Figure 8:
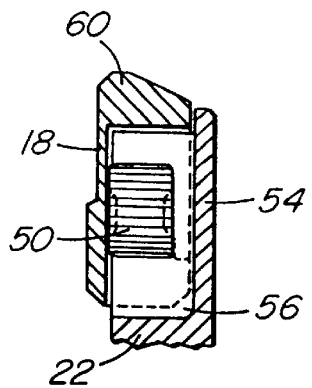
FIG. 8 is a cross-sectional detail showing a resilient torque transmitting connector member for the combined clutch and torsion damper of FIG. 1.
Figure 7:
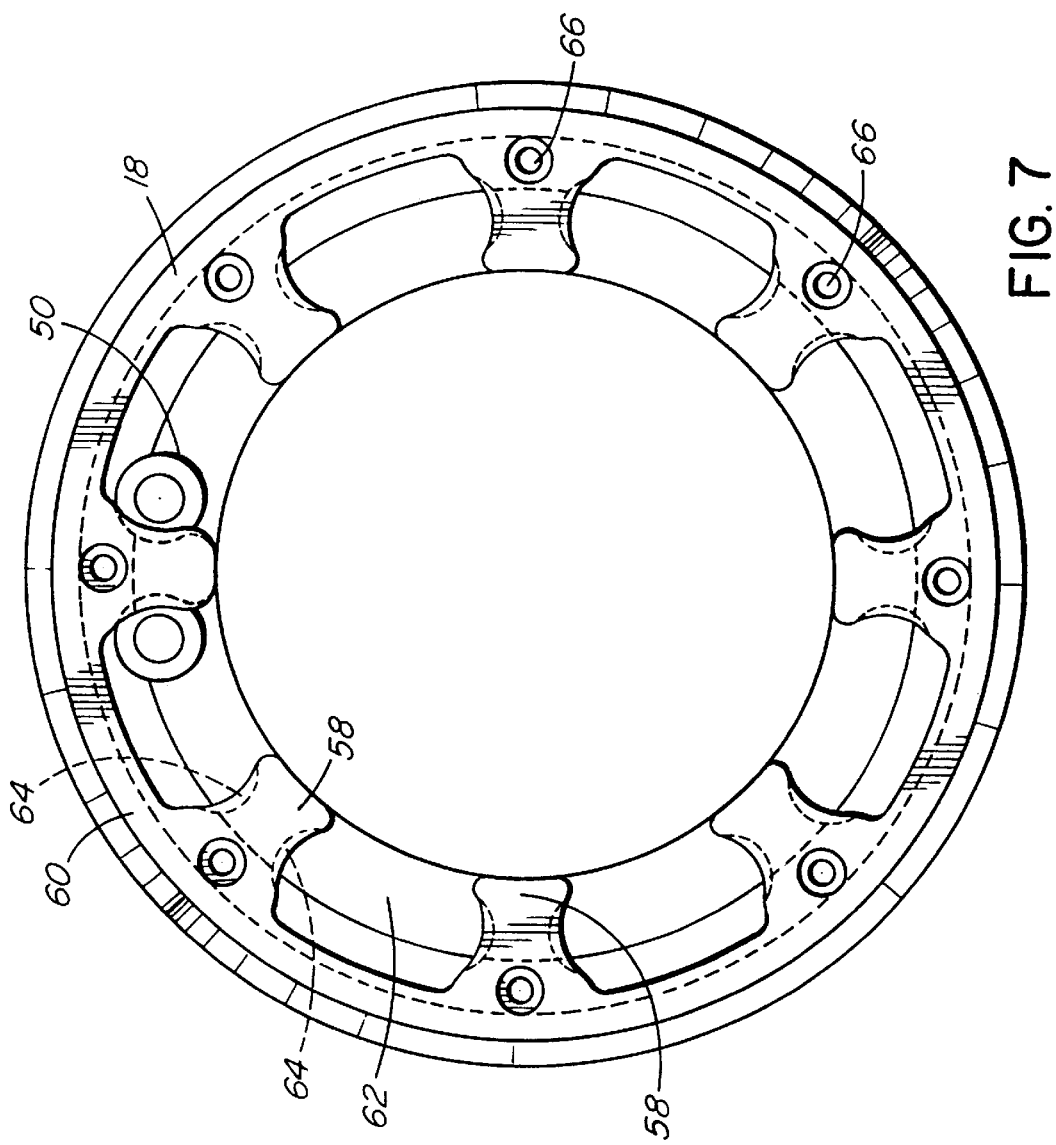
FIG. 7 is a right end view showing the outer ring housing taken at ←7 of FIG. 6.
Figure 6:
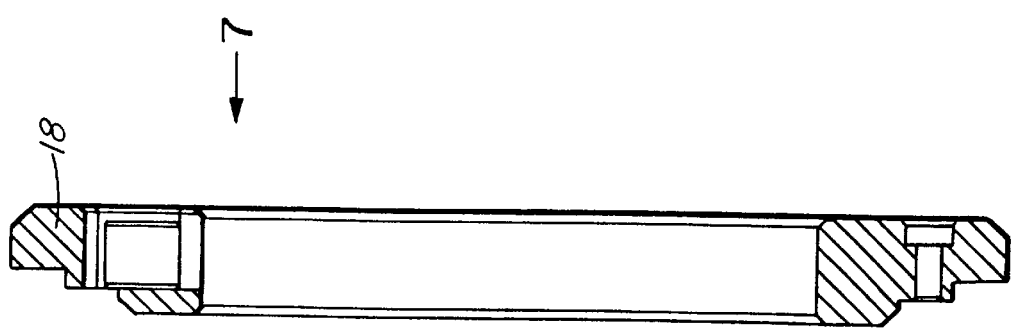
FIG. 6 is an axial cross-sectional view showing an outer ring housing of the combined clutch and torsion damper of FIG. 1.

The outer housing 18 is shown in FIGS. 6 and 7 and has inward projecting shoulders 58 which project inwards from an external ring 60 providing outer location sites 62 to retain the resilient connector members 50 and also the outward projecting shoulders 52 of the inner housing 22. Recesses 64 in the inward projecting shoulders 58 retain the resilient members 50 in place. Details of the connector members 50 are shown in FIG. 8. The connector 50 is cylindrical with frusto-conical indents on each end. Rotational forces are transmitted from the inward projecting shoulders 58 of the outer housing 18 through the connector members 50 to the outward projecting shoulders 52 of the inner housing 22. If the connector members 50 should fail or disintegrate, then the inward projecting shoulders 58 contact the outward projecting shoulders 52 and the rotational forces are transmitted without any damping effect. The size and hardness of the urethane connector members 50 are designed to match the torque transmitted from the motor.

Countersunk holes 66 in the inward projecting shoulders 58 of the outer housing 18 are used for machine screws 20 to hold the outer housing 18 to the adaptor ring 14, or if no adaptor ring is used to the flywheel 10. Both the inner housing 22 and the outer housing 18 are made of aluminum alloy. In one embodiment the units are cast. Lightening holes 68 are shown in the inner housing 22 to reduce the weight to a minimum. The inner housing has bearing seats 70 for the bearings 24, as shown in FIG. 1. The attachment of the inner housing 22 to the central shaft 26 is by the known method of locknut 72 and spacer 74, as shown in FIG. 1.

The electromagnetic clutch has an electrical coil 76 which is fixed to the bell housing 34 by means of machine bolts 77. The coil is located within the clutch ring 32 and when the coil is energized the clutch ring 32 becomes magnetic. On the inner housing 22 there is mounted a thin brass disc 78 held by machine screws 80 which fit into tapped holes 82 as shown in FIG. 5. Two ferrous magnetic rings 84 are attached to the brass disc 78 by means of machine screws 86 positioned midway between the attachment screws 80 holding the brass disc 78 to the inner housing 22. Thus, when the coil 76 is energized the clutch ring 32 becomes magnetic which makes contact with the ferrous magnetic rings 84. The brass disc 78 flexes permitting contact to be made and the rotational forces from the inner housing 22 are transferred to the clutch ring 32 and to the central shaft 26.

A separate lightweight titanium lockplate 90 is shown in FIGS. 1 and 2 engaging in a slot 92 provided in the periphery of the clutch ring 32. The titanium lockplates 90 are lightweight and two are provided. They are positioned to ensure that the combined clutch and torsion damper always remain rotationally balanced. The lockplates 90 are attached to the rim 54 of the inner housing 22 by means of four machine bolts 94. The lockplates 90 are inserted through the apertures 38 in the bell housing 34, and attached to the inner housing 22 by the bolts 94. The bell housing 34 is preferably made out of aluminum alloy to reduce the weight of the unit.

Figure 9:
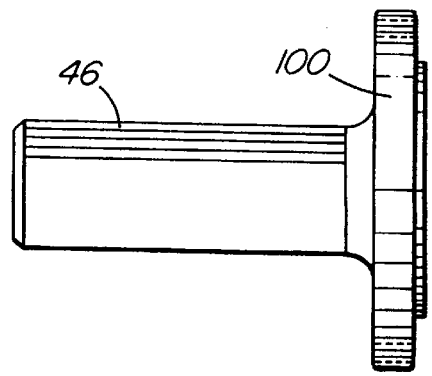
FIG. 9 is a side view showing an optional splined flange shaft to fit within a central shaft of the combined clutch and torsion damper of FIG. 1.

In operation the clutch is activated by a switch 96, generally positioned in the dashboard of the boat, the switch 96 provides power from a power supply in the boat, generally 12V or 24V. The clutch engages pulling the two ferrous magnetic rings 84 to make contact with the magnetic clutch ring 32. Power is transmitted from a motor which may be any suitable power source; a diesel, gasoline, propane, or natural gas, combustion engine, a jet turbine or even an electric motor. The flywheel 10 rotates the outer housing 18 through the adaptor ring 14 if provided, and through the torsion damper to the inner ring 22 and hence by the clutch mechanism to the drive shaft 28. The spline shaft 46 may move longitudinally within the internal spline 44 of the central shaft 26. In one embodiment the spline shaft 46 of the universal joint 48 may be replaced by a spline shaft 46 connected to a flange 100, as shown in FIG. 9.

In another embodiment an electronic speed control 102 is provided in the electrical circuit. The control is a safety device which does not allow the clutch to be engaged above 1,000 rpm shaft speed. This safety device helps eliminate excess wear on the electromagnetic friction plates of the clutch.

In one embodiment a combined clutch and torsion damper is connected to a 350 hp motor and provides a spatial distance of 11½" (30 cm) between the drive shaft and the motor. This dimension is less than the spatial distance for a commercially available torsion damper with a universal joint. The weight of the combined clutch and torsion damper is 10 lbs (4.5 kg) less than the commercially available torsion damper with a universal joint. Different sizes of combined clutch and torsion damper may be made for different capacity motors and power sources. The clutch may easily be disengaged by simply throwing the switch 96 and the motor then rotates without the impeller shaft rotating. Longitudinal movement between the motor and the jet propulsion impeller can occur because the spline shaft 46 can slide in the internal spline 44 of the central shaft 26.

In one embodiment the clutch mechanism is a STOMAG™ clutch adapted for the existing combined clutch and torsion damper of the present invention.

Various changes may be made to the embodiments shown herein without departing from the scope of the present invention which is limited only by the following claims.

I claim:

1. A combined clutch and torsion damper for a water jet propulsion system comprising:

an outer ring housing having attachment to a motor;

an inner housing, concentric and within the outer ring housing, rotatably mounted on a central shaft;

resilient torque transmitting connector members positioned between the inner housing and the outer housing to dampen rotational forces transmitted from the outer housing to the inner housing;

an electromagnetic clutch positioned between the inner housing and a clutch ring concentrically mounted on the central shaft, and a slip joint connection on the central shaft, to a water jet impeller shaft.

2. The combined clutch and torsion damper according to claim 1 wherein the slip joint connection on the central shaft connects to the water jet impeller shaft via a universal joint.

3. The combined clutch and torsion damper according to claim 2 wherein the slip joint connection comprises an interior spline output connection in the central shaft.

4. The combined clutch and torsion damper according to claim 2 wherein the outer ring housing is connected to a flywheel of a motor.

5. The combined clutch and torsion damper according to claim 4 including an adaptor ring between the flywheel and the outer ring housing to accommodate different sizes of flywheel.

6. The combined clutch and torsion damper according to claim 2 wherein the torsion damper comprises substantially cylindrical resilient connector members, the connector members positioned between inward projecting shoulders from the outer housing and outward projecting shoulders from the inner housing, the inner projecting shoulders engaging the outward projecting shoulders in the event of the connector members failing.

7. The combined clutch and torsion damper according to claim 6 wherein the connector members are made from urethane which is oil resistant, chemical resistant and heat resistant to 230° F. (110° C.).

8. The combined clutch and torsion damper according to claim 2 wherein the outer ring housing and the inner housing are formed from aluminum alloy.

9. The combined clutch and torsion damper according to claim 2 including manual locks to lock the clutch ring to the inner housing and retain rotational balance.

10. The combined clutch and torsion damper according to claim 9 wherein the manual locks comprise titanium plates.

11. The combined clutch and torsion damper according to claim 9 including a bell housing having a bearing support for the central shaft, the bell housing having at least one maintenance access for inserting the manual locks.

12. The combined clutch and torsion damper according to claim 11 wherein a magnetic coil is attached to the bell housing to magnetize the clutch ring.

13. The combined clutch and torsion damper according to claim 2 wherein the central shaft is hollow and formed of case hardened steel.

14. The combined clutch and torsion damper according to claim 2 including an electronically controlled safety device to prevent the clutch being engaged above 1,000 rpm.

* * * * *